United States Patent [19]

Summers et al.

[11] Patent Number: 4,957,271
[45] Date of Patent: Sep. 18, 1990

[54] CONTAINER FOR MEAT MOLDING

[76] Inventors: Donald L. Summers, 94 Hesterman Dr.; David J. Summers, 2003 Cardinal, both of, Glendale Heights, Ill. 60139

[21] Appl. No.: 361,441

[22] Filed: Jun. 5, 1989

Related U.S. Application Data

[63] Continuation-in-part of Ser. No. 170,794, Mar. 21, 1988, abandoned.

[51] Int. Cl.$^5$ .................. A47J 27/08; B29C 43/54; A23P 1/10
[52] U.S. Cl. ........................ 249/82; 99/351; 100/265; 100/910; 249/167; 426/523
[58] Field of Search ................ 249/82, 117, 121, 167; 99/351; 426/512, 513, 523; 100/265, 910

[56] References Cited

U.S. PATENT DOCUMENTS

| | | | |
|---|---|---|---|
| 1,497,885 | 6/1923 | Adelmann | 99/351 |
| 1,720,367 | 6/1926 | Lidseen | 99/351 |
| 2,310,956 | 2/1943 | Hoy | 99/351 |
| 2,310,957 | 2/1943 | Hoy | 99/351 |
| 2,310,958 | 2/1943 | Hoy | 99/351 |
| 3,646,881 | 3/1972 | Rathjen et al. | 99/351 |
| 4,756,505 | 7/1988 | Vegas | 249/135 |

FOREIGN PATENT DOCUMENTS 158527 2/1933 Switzerland .................. 99/351

Primary Examiner—Jeffery Thurlow
Assistant Examiner—Mathieu Vargot
Attorney, Agent, or Firm—John G. Tolomei

[57] ABSTRACT

A meat mold cover assembly that is simple in construction, easy to engage and disengage from the mold, adds only a small additional volume to the space occupied by the product, and promotes the production of a molded product having uniform dimensions is provided by the use of an internally biased cover assembly that uses points of supports spaced along the length of at least one side of the mold to allow easy release and attachment of the cover assembly to the mold and integral biasing means acting on the lid along at least two lines of action to provide a balanced pressure on the meat. In a more specific form the cover assembly provides these benefits by using at least three spring assemblies that act directly on and within the periphery of the lid on at least two lines of action. The springs are counter acted by a cover support. The support is attached to at least two opposite sides of the mold through one or more hold down bars and pivotable links to engage each side of the mold. On one side of the mold the hold down bar and pivotable link engage the mold at two different points along the length of the mold thereby preventing out of plane rotation of the lid with respect to that side.

5 Claims, 1 Drawing Sheet

U.S. Patent  Sep. 18, 1990  4,957,271

CONTAINER FOR MEAT MOLDING

CROSS REFERENCE TO RELATED APPLICATIONS

This application is a continuation in part of application Ser. No. 170,794 which was filed on Mar. 21, 1988, now abandoned.

FIELD OF THE INVENTION

This invention relates broadly to methods of meat processing and molding deformable materials. More specifically this invention relates to meat molds for shaping processed meat products.

BACKGROUND OF THE INVENTION

It has become common practice to use molds to shape certain meat products such as canned hams and other delicatessen meats. These meat products are prepared by placing portions of raw or partially prepared meat in an open container hereinafter referred to as a mold. A lid adapted to telescope into at least an upper portion of the mold is placed over the top of the mold and onto the meat. Springs or other resilient biasing means are used to urge the lid into the mold thereby exerting a pressure on the meat that conforms it to the shape of the mold.

Typically the meat will be cooked while it is in the mold. In order to maximize oven utilization the meat molds and the means used to urge the lid into the mold should take up as little space as possible. Ideally the molding apparatus would have dimensions only slightly greater than the size of the product being molded. Of course some additional height is necessary on the top of the mold to allow for vertical compaction as the meat conforms to the shape of the mold. One problem with a type of apparatus that finds widespread use in the molding of ham is the large amount of additional space required for the apparatus to attach the lid to the mold and urge the lid into the mold.

U.S. Pat. Nos. 2,310,956, 2,310,957, and 2,310,958 issued to F. H. Hoy on Feb. 16, 1943 exemplify the most commonly used type of meat mold. In all of these devices the lid or cover is secured and aligned over the mold by a pin that engages a bore. Both the pin and bore are located outside the periphery of the mold and add substantially to the length of the mold. In addition to the volume taken up by the pin and the bore, more space is needed to accommodate the apparatus for supplying the biasing force to the cover. This apparatus consists of large springs located to the outside of the pin and bore assemblies or compression spring assemblies located on top of one or more molds.

Aside from reducing oven volume by taking up additional space, the pin and bore assemblies and spring tensioning devices have posed operational and safety problems. A relatively tight tolerance must be kept between the pins and bores in order to prevent the lid from tilting while the meat undergoes compaction. As a result sticking and jamming of the lids within the containers or sticking and jamming of a cover assembly for attaching and urging the lid into the mold is a common place occurrence during assembly and disassembly of the molds from the cover assemblies. This sticking and jamming combined with the need to stretch the compression springs over the outside of the molds have led to numerous injuries when loading and unloading the molds. Finally having the compression springs at the outermost ends of the molds, combined with the non-uniformity in the compressibility of the meat pieces across the mold, increases the susceptibility of the mold to produce a final product with an unacceptable degree of dimensional variation over its top surface.

A number of other mold designs are known which attach a meatmold cover to a lip that extends around the outside of the mold. These designs are shown in Rathjen et. al. U.S. Pat. No. 3,646,881, G. Lidseen U.S. Pat. No. 1,720,367, H. Adelman U.S. Pat. No. 1,497,885 and Swiss Pat. No. 158527. The meatmolds in all of these references have covers that are either relatively unstable or require three or more supports to obtain stability. In addition the catches for attaching the covers in all of these references are relatively complex and can be adjusted to a variety of positions which makes their use more difficult.

Vegas U.S. Pat. No. 4,756,505 shows an open basket type meatmold that has cover which engages the sides of the molds over a substantial length of the mold. The cover resiliently biases an engaging rod into the side of the mold to provide a flexible detente. This flexible detente system cannot provide positive downward pressure on the mold product while it is cooking and is designed to be displaced upward by expansion of the mold product. Moreover the design of the flexible detente does not provide uniform pressure to the mold product and therefore cannot promote uniform dimensions for the meatmold product.

BRIEF SUMMARY OF THE INVENTION

This invention provides the first meat mold cover assembly that is simple in construction, easy to engage and disengage from the mold, adds only a small additional volume to the space occupied by the product, and promotes the production of a molded product having uniform dimensions. Thus this invention is an internally biased cover assembly that uses points of supports spaced along the length of at least one side of the mold to allow easy release and attachment of the cover assembly to the mold through a rigid detente and includes integral biasing means acting on the lid along at least two lines of action to provide a balanced pressure on the meat. In a more specific form the cover assembly provides these benefits by using at least three spring assemblies that act directly on and within the periphery of the lid on at least two lines of action. The springs are counter acted by a cover support. The cover support is attached to at least two opposite sides of the mold through one or more attachment bars and pivotable links that inflexibly engage each side of the mold. On one side of the mold the hold down bar and pivotable link engage the mold at two different points along the length of the mold thereby preventing out of plane rotation of the lid with respect to that side.

Accordingly it is an object of this invention to provide a meat mold cover assembly that is easily attachable and detachable from a meat mold.

It is a further object of this invention to provide a meat mold and cover assembly of reduced dimensions relative to the dimensions of the molded product.

It is a yet further object of this invention to provide an easily attachable and detachable meat mold cover assembly that is attached to a meatmold through an inflexible and unadjustable detente which provides molded meat products of more consistent dimensions than those produced by molds now in use.

Another object of this invention is to provide a meat mold cover that is readily adapted for use on existing molds.

In its simplest aspects this invention is a meat mold cover assembly including a means for applying a biasing force, balanced over the area of a lid, at at least three nonuniformly aligned locations on the surface of the lid. The biasing force is reacted against one or more attachment bars. The attachment bars can be moved into restraining position by the pivotal movement of only two attachment elements. The attachment bar is restrained against outward movement with respect to a mold by attachment to at least two opposite sides of said mold with pivotable links that extend between the mold and the attachment bar. Rotation of the cover assembly out of the plane of the mold opening is prevented by its attachment to the two opposing sides of the mold and attachment of the cover assembly to at least one of the opposing sides of the mold along a line of action parallel to the principle plane of the cover. The line of action extends over a substantial length of the mold to prevent rotation of the cover support in a direction perpendicular to the line of action.

A more complete embodiment of this invention is an apparatus for shaping meats which comprises a mold having substantially vertical side walls and an open top and a cover assembly. The cover assembly has a lid for telescopic insertion into the mold and at least three springs in contact with the lid at three discrete and non-collinear points. One or more attachment bars contacts the ends of the springs opposite the lid. Means for guiding the lid with respect to the attachment bars, such as spring retainers are provided. In order to secure the cover assembly and transfer the force from the springs to the mold a pair of elongate support rods are movably mounted to the attachment bars for engagement and disengagement with opposing side walls of the mold. The support rods contact at least one lip that is located on the opposing side walls and is arranged to provide an extended line of support over the length of the side wall. This line of support prevents relative upward movement of the support rod when it is engaged with the side wall.

In another embodiment this invention is an apparatus for molding meats that comprises a mold having an open end and a cover assembly having a lid for telescopic insertion into said mold. At least three resilient elements in said cover assembly contact the top of said lid at at least three discrete and non-colinear points for applying a force to urge the lid into the mold. A first attachment means in the cover assembly counteracts the force of the resilient elements and at least in part attachs and guides the lid relative to the mold. A second attachment means is located on at least one of the mold and the cover assembly for at least in part attaching the cover assembly to the mold, restraining the cover assembly against outward movement with respect to the mold, and compressing the resilient elements. The second attachment means includes at least two points of support on one side of the mold which are spaced apart by at least half of the maximum dimension of the cover as measured along a line parallel to the at least two points of support and at least one additional point of support on a side of the mold opposite the side of the mold having the at least two points of support and an inflexible detente arrangement that when engaged prevents movement of the first attachment means away from the mold.

Other objectives, embodiments, and details of the invention will be explained in the following description of the preferred embodiment.

DETAILED DESCRIPTION OF THE PREFERRED EMBODIMENT

Figure 1:
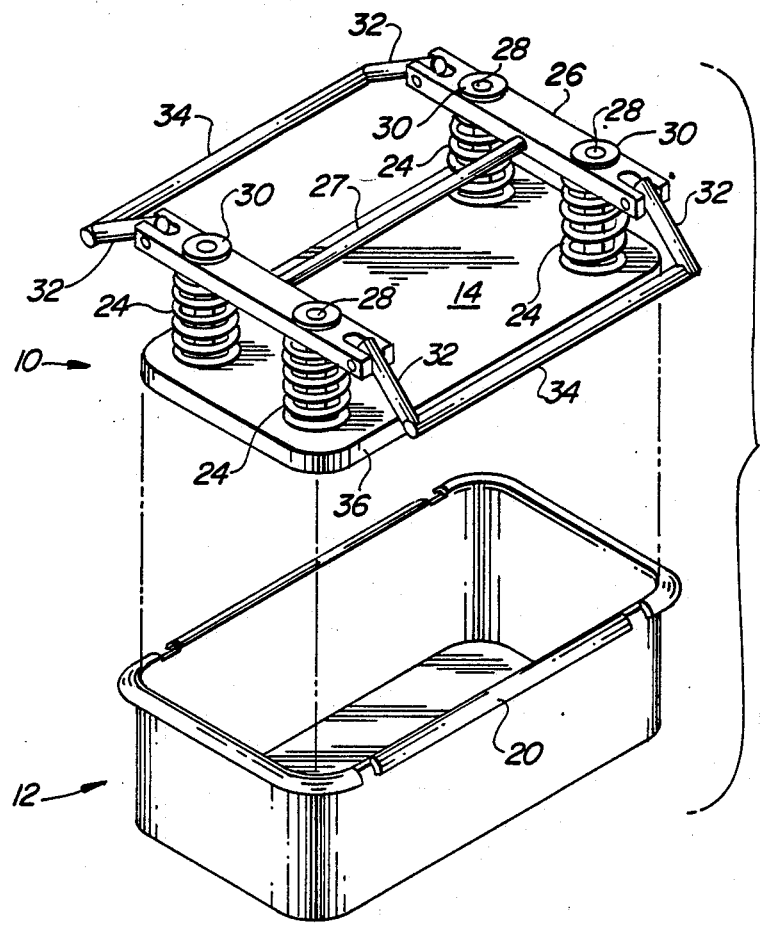
FIG. 1 is an isometric view looking down on the top of a cover assembly and meat mold of this invention.

As shown in FIG. 1 a cover assembly 10 and a meat mold 12 are used in combination to achieve the advantages of this invention. Mold 12 has substantially vertical sidewall 16 spanning its long dimension and a substantially vertical side wall 18 spanning its short dimension. A lip 20 borders the entire top of the mold and extends outward therefrom. FIG. 1 shows the cover assembly adapted to fit a mold having a rectangular opening however suitable molds can have a variety of configurations provided that the lid portion of the cover assembly can fit into the opening and telescope down at least an upper portion of the mold.

A lid 14 is positioned near the top of mold 12. Meat packed into the mold will support the bottom of the lid and provide and upward pressure tending to push the cover assembly off of the mold. Coil springs 24 contact the top of the lid and provide means, in the form of resilient elements, for biasing the lid into the mold that act against the resistance of the meat located therein. FIG. 1 shows the preferred arrangement for the resilient elements where a spring is located in each quadrant of the lid to act at discrete points. However fewer elements can be used to provide the biasing means as long as the biasing means acts along more than one line of action in the plane of the lid so that a balanced force is applied over the entire top of the lid. In this regard it has been found that when all of the resilient elements are arranged along the same line the lid is unstable and tends to rotate along the line of support. This tendency to rotate is believed to be responsible at least in part for the jamming and surface irregularity problems associated with some of the prior art devices.

A pair of attachment bars 26 act as hold down members and provide means for resisting the downward force of the springs on the lid and provide part of the means for attaching the lid to mold. The attachment bars 26 contact the end of springs 24 that are opposite the lid. Attachment bars 26 also guide the lid with respect to the rest of cover assembly 10. A spring retainer consisting of a rod 28 fixed to the top of lid 14 at one end and a stop plate 30 at the opposite end passes through a hole in the top of the attachment bar. Preferably, when the lid is not applying pressure to material in the mold, the spring 24 will have a slight preload that keeps end plate 30 in contact with the top of attachment bar 26 and prevents the lid from moving with respect to the rest of the cover plate assembly. A running fit is provided between the hole in the attachment bar and rod 28 so that when the lid is pressed downward onto meat in the mold and pushed upward relative to the attachment bar, the rod and attachment bar guide the lid with respect to the mold and cover assembly. The attachment bars are also connected by a top rod 27. Rod 27 does not provide rigid support to the attachment bars, however such a member can be provided or the attachment bars can be formed from a single member, if desired.

At the end of each attachment bar a link 32 connects an elongate support rod 34 to the attachment bar. The links and support rods together form an inflexible detente that prevents the attachment bars from moving away from the mold. The ends of links 32 located at the attachment bar are pivotably connected thereto by means of a pin passing through a hole in the link and retained in the attachment bar. Links 32 and support rods 34 provide the rest of the means for attaching the cover assembly to the mold and reacting the force of the biasing means. The support rods secure the cover assembly to the lid by engaging the underside of lip 20. In order for the support rod to rotate under lip 20 a portion of the lip is cut away to form a slot 21 in the mold that is aligned with each link. Upward force, transmitted via the springs 24 and the attachment bars 26, keep the support rods 34 engaged with lip 20. Unless relieved in a manner hereinafter described this upward force causes the support rods and links to provide the inflexible detente when engaged and behave as if rigidly attached to the mold.

Relative rotation of the cover assembly with respect to the mold is prevented by the manner in which the support rods contact the mold. The support rods contact opposite sides of the mold to prevent a relative rotation about a line parallel to the support rods. At least one of the support rods contacts the same side of the container at two or more points that are spaced apart along the length of the side wall, i.e. in a horizontal direction. Having support from more than one point on a side wall prevents rotation of the cover assembly about an axis normal to that side wall. It is preferred that the points of support on the same side wall be spaced apart by at least half the distance of that sidewall. It is also preferred that the points of support be spaced along the longest sidewall. By having the points spaced apart horizontally, the support rod can be easily engaged and disengaged from the mold. Thus tubular guide members - another source of striking and jamming during assembly and disassembly of the molds and covers - that were used to restrain rotation of the cover assembly out of plane of the mold side walls can be eliminated.

In preferred form the support rods are pivoted downward against the long sides of the rectangular mold while downward force applied to the top of the cover assembly displaces the attachment bars downward with respect to the lid and mold so that the support rods 34 can move underneath the lip 30 and into engagement therewith following subsequent removal of the downward force. However the cover assembly can have the support rods engage supports on any two opposing side walls of the mold. In fact this invention may use an arrangement wherein the support rods are pivotally attached to the mold and engage supports on the cover assembly. In addition the preferred embodiment shows the use of two links on each support rod; nevertheless the same functions can be achieved using a single link having sufficient stiffness and support to transfer a rotation resisting moment from multiple support points on either the cover assembly or the mold. It should also be noted that the lip for engaging the support rod need not be at the top of the mold but may be at the bottom or some intermediate point if a lip around the top of the mold is not desired.

In order to more fully describe the invention, application of the cover assembly to a mold containing meat is described by reference to FIG. 2. Cover assembly 10 is first placed over the mold with the underside of lid 14 in contact with the meat. When the cover assembly rests on top of the meat, attachment bars are in position 26', and the support rods are pivoted toward the outside of the cover.

The cover assembly is secured to the mold by pressing down on the attachment bars with sufficient pressure to move the attachment bars to position 26. in so doing the springs move from position 24' to position 24. A relatively high force is applied to the meat in the mold so it is contemplated that an air jack or other device will be used to quickly displace the attachment bars and compress the springs. When in position 24 the support rods are rotated from position 34' to position 34 and the downward force is removed from the attachment bars at which time the attachment bars rebound slightly and lock support rods 34 into engagement with lip 20. As the meat compresses and conforms to the mold during cooking or curing, lid 14 is displaced downward by the springs 24. By reversing the above procedure the cover assembly may be removed from the mold.

Figure 2:
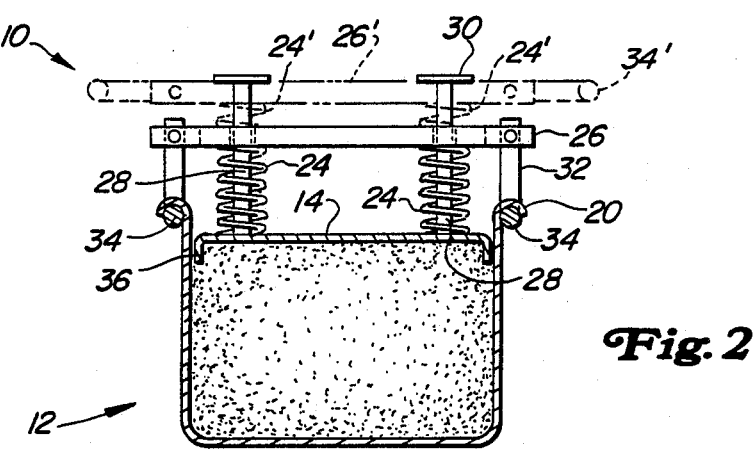
FIG. 2 is a section of the cover and meat mold of FIG. 1 taken along a line 2—2.

As shown by FIGS. 1 and 2 the cover assembly is extremely compact. The outer edges of the cover do not extend past the lip that borders the opening of the mold. Therefore for molds having a lip bordering its outside, the cover assembly will not take up any more surface area than that already occupied by the mold itself. Where a particular mold does not have an outer lip, the amount by which the dimensions of the cover assembly must extend past the side walls of the mold will only equal the thickness of the support rods and/or links. Furthermore this additional width is only needed on two sides of the mold. In most cases the width of the support rods and links will not exceed the thickness of the lid which normally includes an edge rim 36 as shown in FIG. 2. The vertical height of the cover assembly when positioned over the mold is also small. The height of the cover assembly above the mold is dictated by the height of the spring retainer rods 28. Usually these rods will not extend above the mold by more than one and a half times the projection of the lid into the mold. Rods 28, when positioned symmetrically on the top of the mold also provide relatively level supports for the stacking of multiple molds.

In another aspect the cover assembly is particularly suited for retrofit on existing molds. Such a retrofit is easily accomplished by simply providing the necessary supports on the mold for the support rods. For molds having a lip this is easily accomplished by cutting away the lip to accommodate the necessary links for the support rods.

What is claimed is:

1. A mold apparatus for shaping meats having an open interior for the containment of said meat that is free from elements of said mold apparatus, said apparatus comprising:
   a rectangular mold having a pair of long and a pair of short, substantially vertical, opposing side walls and an open top;
   a cover assembly having a lid for telescopic insertion into said mold, at least three springs in contact with said lid at at least three discrete and non-colinear points, at least one attachment bar in contact with said springs at the ends of said springs opposite said lid, means for guiding said lid with respect to said attachment bar and a pair of inflexible and nonadjustable stops for preventing outward movement of the attachment bar with respect to said mold, each of said stops including a single support rod hinged to said attachment bar for engagement and disengagement with one sidewall of said pair of long opposing side walls, at least one of said support rods comprising an elongated support rod having a length equal to at least half the dimension of the sidewall engaged by said elongated support rod; and, a lip on one of said long opposing side walls arranged to engage said elongated support rod and provide an extended line of rigid support over the length of said elongated support rod to prevent relative upward movement and rotation of said attachment bar said lip being provided with slot means to engagably receive one of said stops.

2. The apparatus of claim 1 wherein a coil spring is provided in each quadrant of said lid, a spring retainer fixed to said lid extends through each spring and attachment bar and said attachment bar cooperates with said retainer to provide said means for guiding.

3. The apparatus of claim 2 wherein said stop includes a link at each end of each support rod connecting it with at least one attachment bar.

4. The apparatus of claim 3 wherein said cover assembly has two attachment bars straddling the short sides of said mold and the links for each support rod are hinged at the end of a different attachment bar.

5. The apparatus of claim 4 wherein said lip at least partially borders said opening.

* * * * *